United States Patent [19]

Miyabe et al.

[11] Patent Number: 5,606,628
[45] Date of Patent: Feb. 25, 1997

[54] APPARATUS AND METHOD FOR GENERATING BIT-MAPPED PATTERNS OF PRINT CHARACTERS

[75] Inventors: Yoshiyuki Miyabe, Osaka; Masaru Nakai, Moriguchi; Katsuyuki Morita, Ikeda; Taketo Yoshii, Amagasaki; Mika Matsui, Hirakata, all of Japan

[73] Assignee: Matsushita Electric Industrial Co., Ltd., Osaka, Japan

[21] Appl. No.: 349,394

[22] Filed: Dec. 5, 1994

[30] Foreign Application Priority Data

Dec. 6, 1993 [JP] Japan ................................ 5-305495

[51] Int. Cl.⁶ ........................................... G06K 9/00
[52] U.S. Cl. ........................... 382/183; 382/190; 380/54
[58] Field of Search .................................. 358/462, 470, 358/454, 459, 458, 460, 463, 456, 429, 457, 461; 380/5, 54; 348/461, 468; 382/295, 296, 237, 135, 137, 138, 139, 140, 182, 184, 185, 186, 187, 188, 196, 197, 198, 209, 183, 190; 340/825.34

[56] References Cited

U.S. PATENT DOCUMENTS

| | | | |
|---|---|---|---|
| 3,990,043 | 11/1976 | Clark | 382/182 |
| 4,641,347 | 2/1987 | Clark et al. | 380/3 |
| 4,703,511 | 10/1987 | Conoval | 382/182 |
| 4,809,342 | 2/1989 | Kappner | 382/182 |
| 5,050,121 | 9/1991 | Vaughan | 364/900 |
| 5,081,594 | 1/1992 | Horsley | 395/150 |
| 5,220,649 | 6/1993 | Forcier | 395/148 |
| 5,231,698 | 7/1993 | Forcier | 395/146 |

FOREIGN PATENT DOCUMENTS 56-36770  4/1981  Japan ........................ G06K 9/18

*Primary Examiner*—Leo Boudreau
*Assistant Examiner*—Bijan Tadayon
*Attorney, Agent, or Firm*—Price, Gess & Ubell

[57] ABSTRACT

A bit map pattern generation apparatus can generate an outline of a character with embedded patterns in the form of a bar code. A printer can print the character images pursuant to the generated bit map pattern. The patterns can provide a verification of the authenticity of the characters on a document.

20 Claims, 16 Drawing Sheets

Fig. 5A
| | | |
|---|---|---|
| H1 | (170, 60) | (310, 60) |
| H2 | (30, 240) | (170, 240) |
| H3 | (170, 240) | (390, 240) |
| H4 | (30, 330) | (170, 330) |
| . | . | |
| . | . | |
| V1 | (170, 60) | (170, 240) |
| V2 | (260, 140) | (260, 240) |
| V3 | (30, 240) | (30, 330) |
| C1 | (530, 160) | (390, 390) |
| C2 | (620, 160) | (440, 450) |
| C3 | (650, 170) | (800, 480) |
| C4 | (720, 180) | (880, 430) |
| C5 | . | |
| C6 | . | |
| O1 | . | |
| O2 | . | |
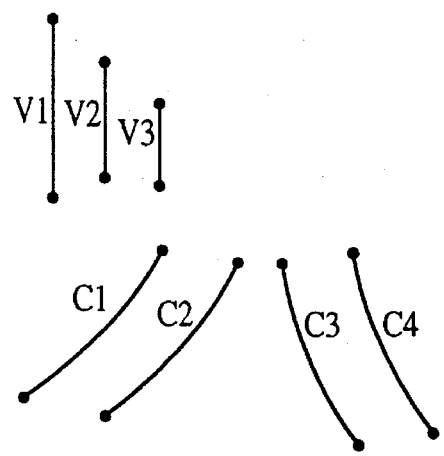
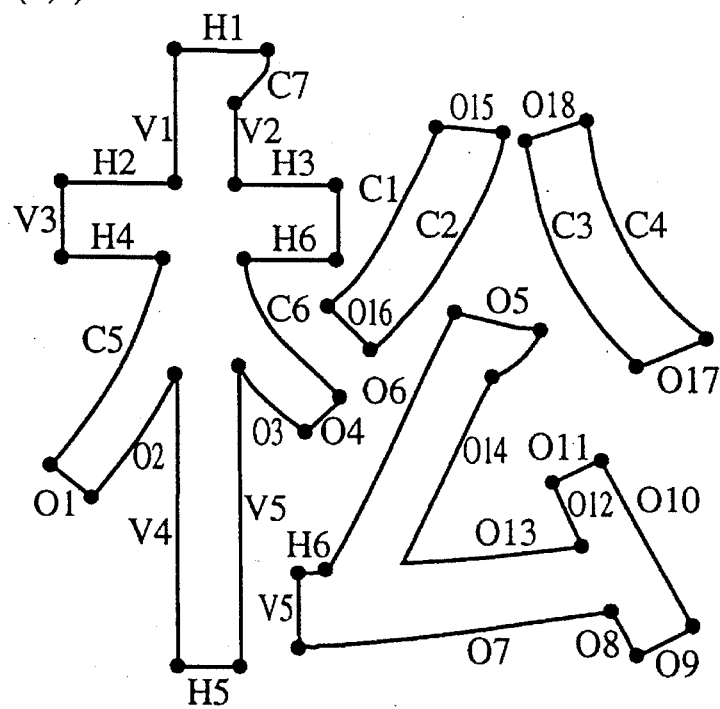
Fig. 5B

| | $Z10$ $Z12$ $Z14$ | $Z11$ $Z13$ $Z15$ $Z17$ |
|---|---|---|
| pair1 | (170、130) | (260、130) |
| pair2 | (170、131) | (260、131) |
| pair3 | (170、132) | (260、132) |
| pair4 | (170、133) | (260、133) |
| pair5 | (170、134) | (260、134) |
| pair6 | (170、135) | (260、135) |
| ⋮ | ⋮ $Z16$ | |
| pair104 | (170、234) | (260、234) |
| pair105 | (170、235) | (260、235) |
| pair106 | (170、236) | (260、236) |
| pair107 | (170、237) | (260、237) |
| pair108 | (170、238) | (260、238) |
| pair109 | (170、239) | (260、239) |
| | (170、240) | (260、240) |

APPARATUS AND METHOD FOR GENERATING BIT-MAPPED PATTERNS OF PRINT CHARACTERS

BACKGROUND OF THE INVENTION (1) Field of the Invention

The present invention relates to an apparatus and method for generating a bit-mapped pattern of a print character by embedding embedding-patterns on and inside the outlines of the bit-mapped character.

(2) Description of the Related Art

A method for securing the contents of stored documents against falsification or forgery, which has recently become a serious issue, has been developed.

One way of falsifying a document is to paste up a tempered document generated with the use of a document generation apparatus over a part of a stored document, without leaving any evidence behind. This way, for example, allows an amount of money printed on paper to be illegally rewritten, leaving a seal or signature as it is. As a result, it gets harder to reveal the presence of falsification.

In order to discover the falsification without fail, it is possible to embed data in every character contained in a document in order to indicate the originality of the document.

One example of such a code-embedded character technique is disclosed in the Japanese Laid-open Patent Application No. 56-36770. The art of the application is explained as follows with reference to FIG. 1.

First of all, data to be read are transferred into binary data, and each bit of the binary data is made to correspond to a coordinate of a print character in the horizontal direction. For example, when data to be read consists of 64 bits (8 bytes) and the bit-mapped character has 64×64 dots, then the 0th bit and the 48th bit of the data are made to correspond to the 0th dot and the 48th dot respectively. After this corresponding operation, the dots in the data corresponding to "1" are not filled in. If the 11th, 31st, and 51st bits are "1", the 11th, 31st, and 51st dots in the vertical direction are not filled in. Thus, binary data expressed in blanks can be read through raster scanning.

If these data are used to certify the originality of every character in a document, the presence of falsification can be detected without fail.

Adding the document generator's name and the date of the generation to the data to be read makes the guarantee more firm.

The row and column of every character in a document can be checked by using the data to be read as the position of each character.

According to this conventional technique, the presence of falsification can be detected without fail as long as the data are firmly embedded in every character; however, the embedding is unreliable because of the frequent occurrence of bit garbling.

The width of pattern-embedded area is different depending on characters as apparent from the widths c10, c11, and c12 shown in FIG. 2, so that the width of margins at both sides of each character is also different depending on characters, as apparent from the margins b31, b32, and b33. Since the margins look the same as the blanked dots, the horizontal coordinates corresponding to the margins b31, b32, and b33 are mistaken as "1". As a result, data to be read tend to be garbled.

Although it is possible to make the width of pattern-embedded area uniform, it spoils the appearance of the characters to be printed.

SUMMARY OF THE INVENTION

The first object of the present invention is to provide an apparatus for generating bit-mapped patterns of characters capable of embedding predetermined data in every character of a document without causing bit garbling when the data are read.

The second object of the present invention is to provide an apparatus for generating bit-mapped patterns of characters capable of embedding predetermined data in every character of a document without spoiling the appearance of the characters.

The third object of the present invention is to provide an apparatus for generating bit-mapped patterns of characters capable of detecting the presence of falsification or forgery.

The fourth object of the present invention is to provide a method for generating bit-mapped patterns of characters capable of embedding predetermined data in every character in a document without causing bit garbling when the data are read.

The first object can be achieved by an apparatus for generating a bit-mapped pattern by embedding embedding-patterns on and inside of outlines of a character to be printed by a printer. The apparatus comprises the following units:

An outline bit-mapped pattern generation unit for generating a bit-mapped pattern of outlines of a character, the bit-mapped pattern being expressed by x and y coordinates;

An embedding-pattern generation unit for generating embedding-patterns which include predetermined information;

An internal embedding unit for embedding the embedding-patterns inside the bit-mapped pattern, the embedding patterns being embedded at every predetermined width in one of x direction and y direction.

According to the apparatus, embedding-patterns corresponding to predetermined data are embedded on and inside the outlines of a character, so that an optical reading device can easily read the data. As a result, documents having characters not easily tempered can be generated.

The second object can be achieved by letting the predetermined information be in a form of a bar code.

According to the apparatus, bar code patterns having predetermined data are embedded on and inside the outlines of a character without spoiling its appearance.

The third object can be achieved by letting the bar code include information on any one of a position of a character on printing paper, a page of the printing paper, a title of a document containing the character, and a generator of the document.

According to the apparatus, the presence of falsification can be easily detected by checking these data.

The fourth object can be achieved by a method for generating a bit-mapped pattern by embedding embedding-patterns on and inside of outlines of a character to be printed by a printer. The method comprises the following steps:

A step of generating a bit-mapped pattern of outlines of a character, the bit-mapped pattern being expressed by x and y coordinates;

A step of Generating embedding-patterns which include predetermined information; and A step of embedding the embedding-patterns inside the bit-mapped pattern, the embedding patterns being embedded at every predetermined width in one of x direction and y direction.

According to the apparatus, embedding-patterns corresponding to predetermined data are embedded on and inside the outlines of a character, so that an optical reading device can easily read the data. As a result, documents having characters which are not easily tempered with can be generated. In addition, data indicating the styles and sizes of characters which cannot be read by an optical reading device can be attached to every character contained in a document. Furthermore, security information which is not easily mistaken can be also attached.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIGS. 5A and 5B show coordinate values of a bit-mapped pattern.

DESCRIPTION OF THE PREFERRED EMBODIMENTS

Embodiment 1

The bit-mapped pattern generation apparatus of this embodiment is described hereinafter with reference to FIG. 3.

Figure 3:
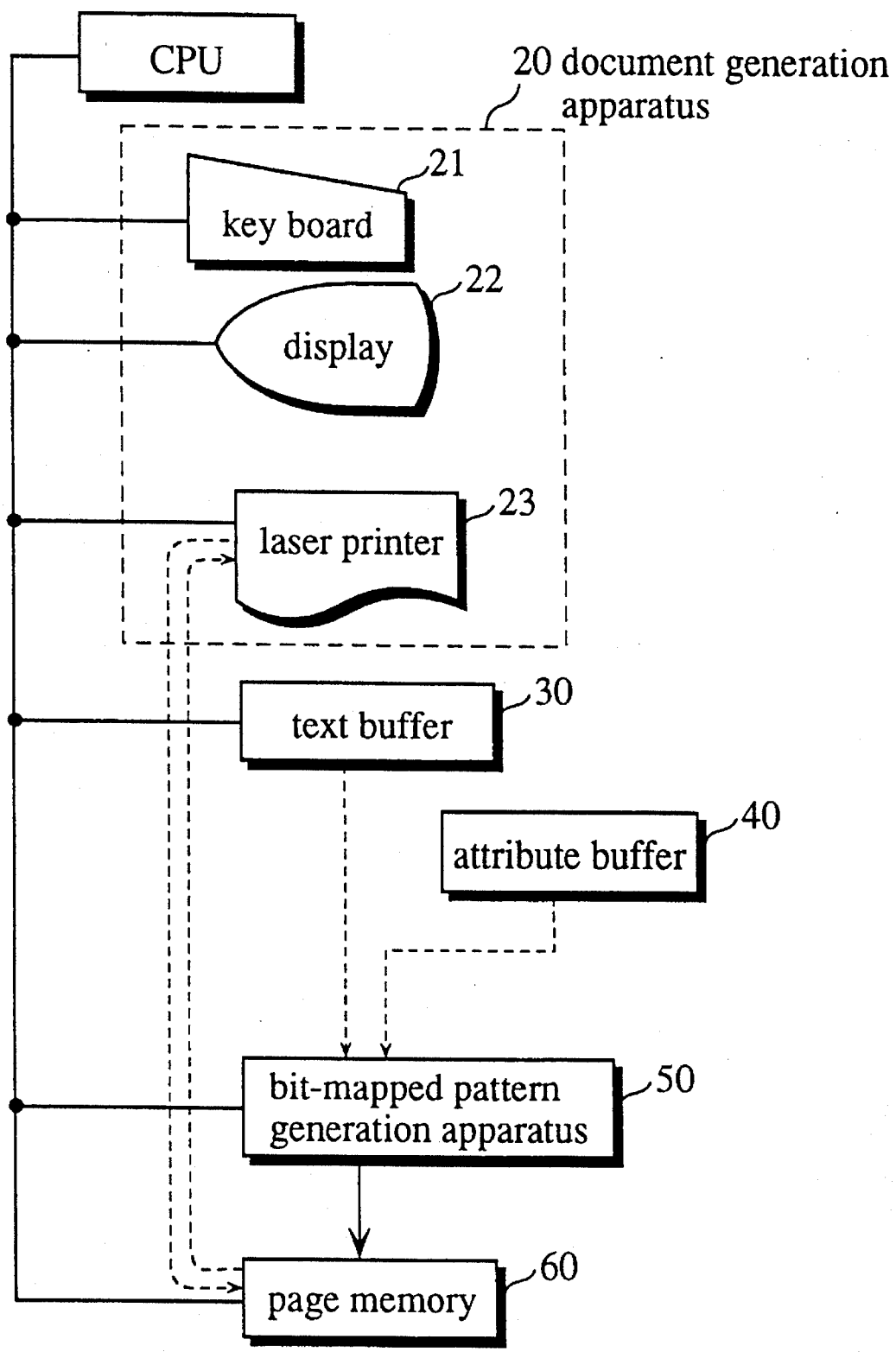
FIG. 3 shows the components of a document generation apparatus including a bit-mapped pattern generation apparatus 50 of the first embodiment.

FIG. 3 shows the components of a document generation apparatus including a bit-mapped pattern generation apparatus 50 of this embodiment. The document generation apparatus is provided with a user interface 20, a text buffer 30, an attribute buffer 40, a bit-mapped pattern generation apparatus 50, and a page memory 60.

The user interface 20 is composed of a key board 21 to which codes are inputted through key punching, a display 22 which shows the generation process of a document in real time, and a laser printer 23 which outputs generated documents onto paper.

The text buffer 30 stores character codes inputted through the key punching.

The character attribute buffer 40 stores a determined character style and the contents of setting the number of points in correspondence with the character code stored in the text buffer 30.

The bit-mapped pattern generation apparatus 50 refers to the text buffer 30 and the character attribute buffer 40, and generates a bit-mapped pattern of a character font. The bit-mapped pattern of a character font expresses a character shape in the form of a two-dimensional collection of dots. A printing operation is carried out by transferring the bit-mapped pattern onto paper.

The page memory 60 stores bit-mapped patterns generated by the bit-mapped pattern generation apparatus 50, for a sheet of paper. The contents of the page memory 60 are transferred on paper to print a one page document. For this, each address stored in the page memory 60 is made to correspond to the coordinates of a character on the paper (these coordinates are called absolute coordinates).

Figure 4:
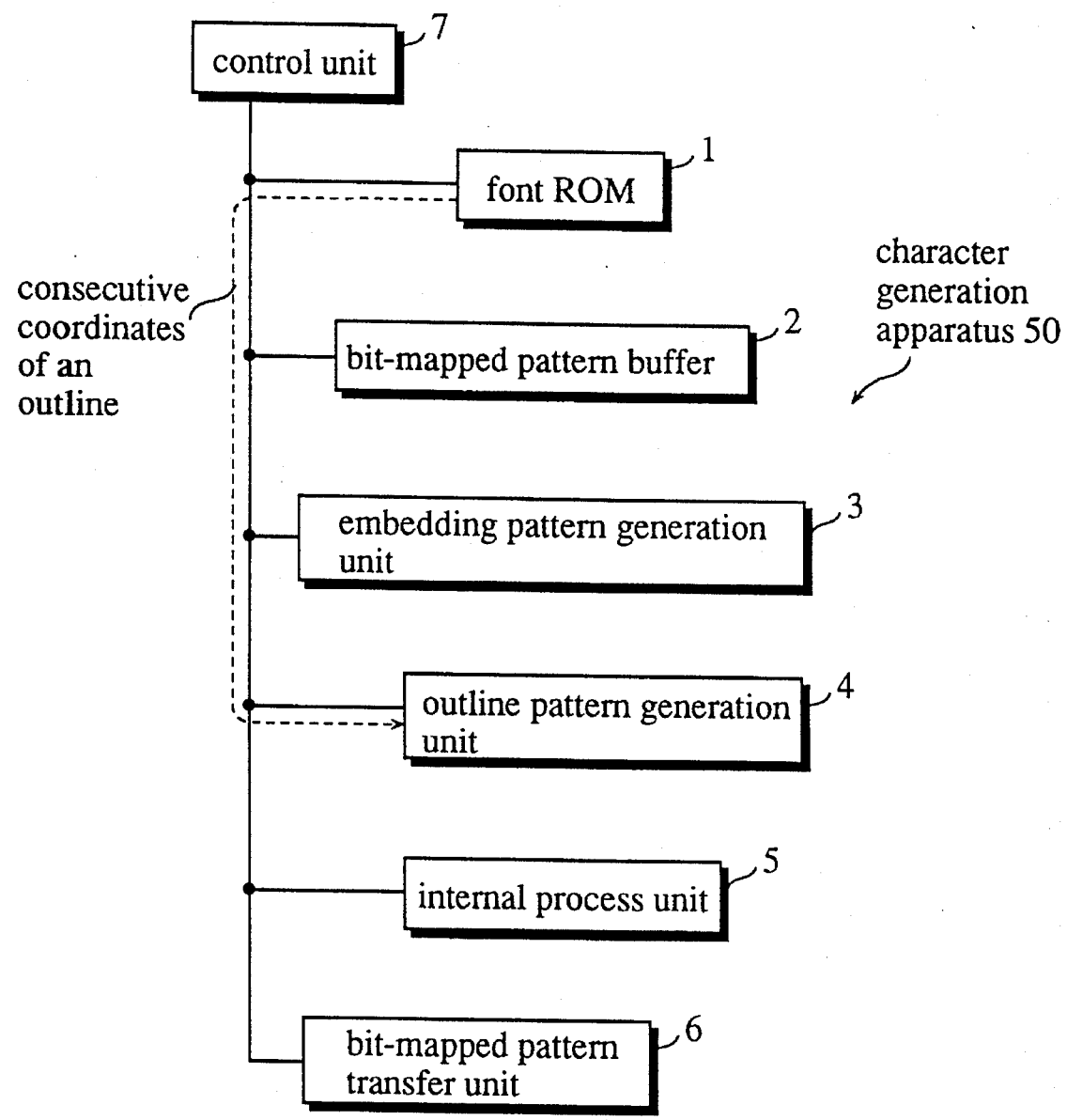
FIG. 4 shows the construction of the bit-mapped pattern generation apparatus 50.

The construction of the bit-mapped pattern generation apparatus 50 is shown in FIG. 4. The bit-mapped pattern generation apparatus 50 is composed of a font ROM 1, a bit-mapped pattern buffer 2, an embedding-pattern generation unit 3, an outline pattern generation unit 4, an internal process unit 5, and a bit-mapped pattern transfer unit 6.

The font ROM 1 stores information on the font of each character in the form of outlines. The outline form is a form which allows a character shape to be restored to the original by the information on its outline.

FIGS. 5A and 5B explain how a chinese character "matsu" (a Japanese word for a pine tree) is stored in the outline form.

As shown in FIG. 5A, the outlines of "matsu" are divided into horizontal lines H1, H2, H3, H4, . . . , vertical lines V1, V2, V3, V4 . . . , curved lines C1, C2, C3, C4, . . . , and slanting lines 01, 02, 03, 04, . . . Furthermore, as shown in FIG. 5B, the starting and terminal points of each line are made to correspond to coordinate values. These coordinate values (170, 60), (310, 60), . . . have a 1024×1024 mesh, and are expanded or reduced in accordance with the character size. The curved lines C1, C2, C3 . . . are called three dimensional Bezier curved line, and can be expanded/reduced by a certain process. The coordinates in font ROM 1 is transformed with the character code, character style, and character size, and the expanded results are expressed as consecutive coordinate values for the outlines: (170, 60), (171, 60), (172, 60), (173, 60), (174, 60), (175, 60) . . .

The technique of outline font is disclosed in "Digital Typography—An Introduction to Type and Composition for Computer System Design" by Richard Rubinstein, Addison-Wesley, ISBN 0-201-17633-5.

Figure 6:
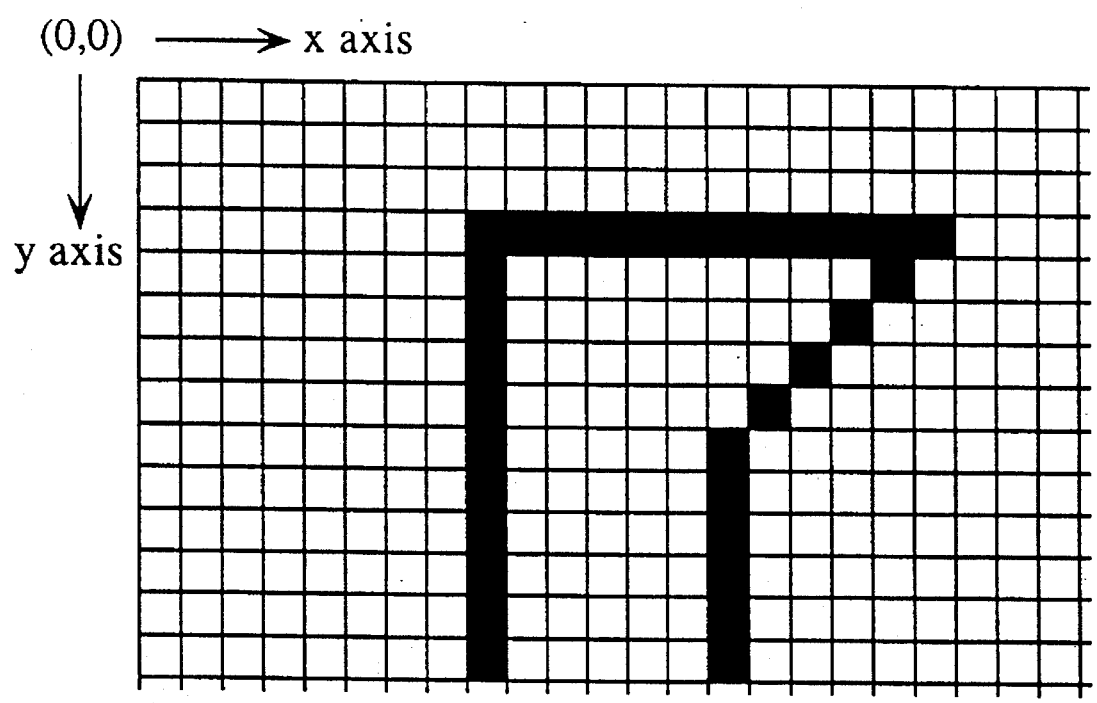
FIG. 6 is an illustration for explaining a bit-mapped pattern buffer 2.

The bit-mapped pattern buffer 2 has a RAM area for font ROM transformation, where a bit-mapped pattern corresponding to the character font is generated. Each dot in the bit-mapped pattern buffer 2 is given a relative coordinate value of a rectangular coordinate system having X-Y axes as shown in FIG. 6. The coordinate value has its origin (0,0) at the top-left. Designating a coordinate value and whether the coordinate value is "1" or "0" determines whether each dot is filled in or not.

The embedding-pattern generation unit 3 generates patterns in the form of bar codes to be embedded inside the outlines of the bit-mapped pattern of a character.

Figure 1:
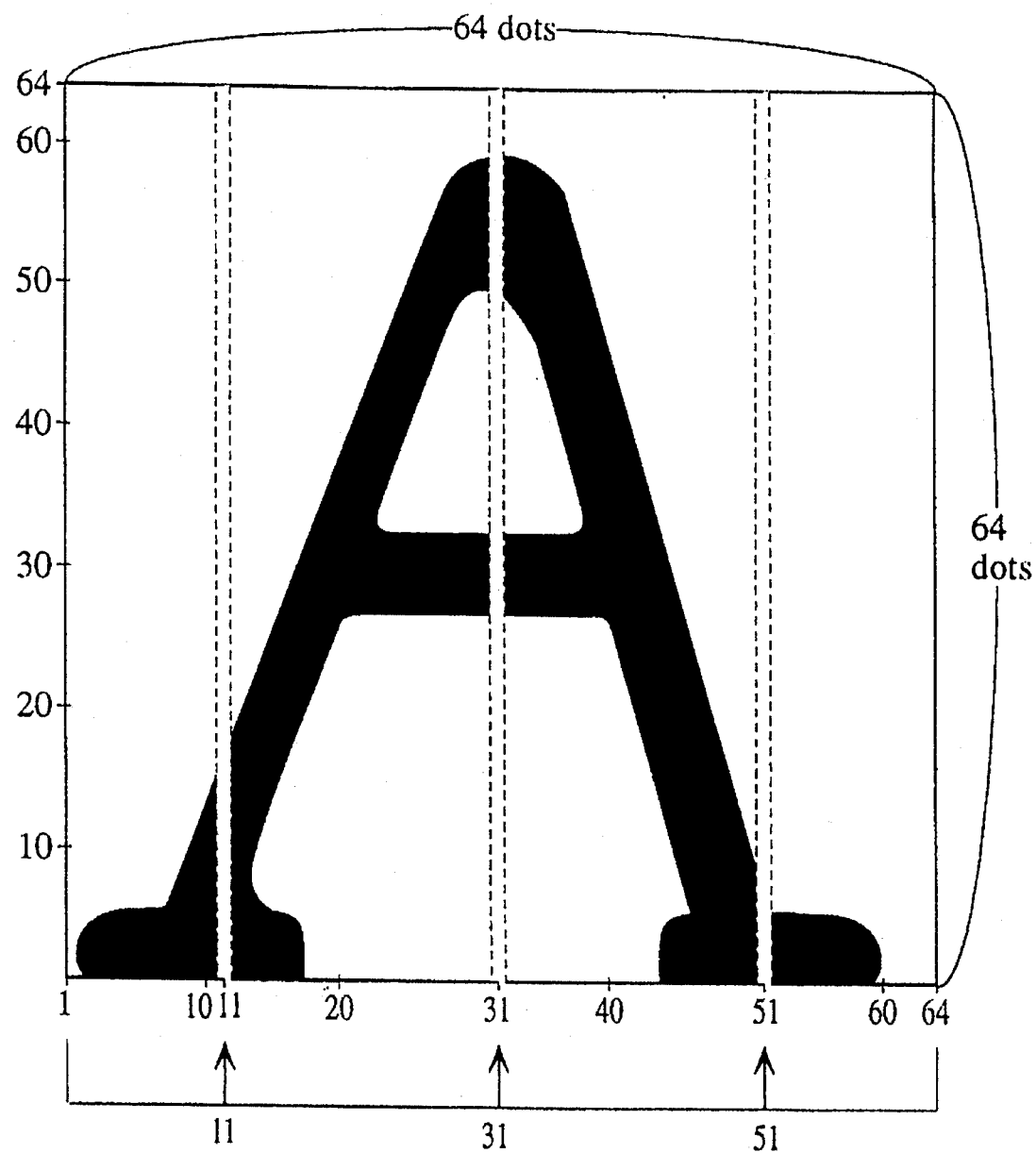
FIG. 1 shows a conventional code-embedded character.
Figure 2:
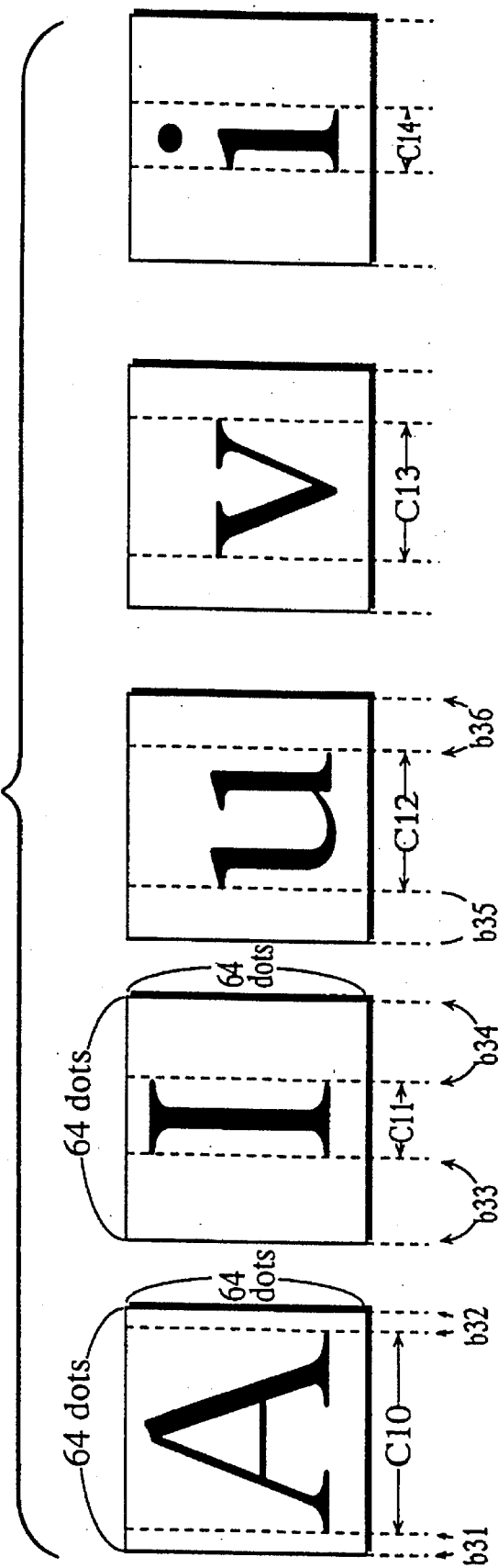
FIG. 2 shows characters to be used for explaining the problems of the conventional code-embedding technique.
Figure 7A:
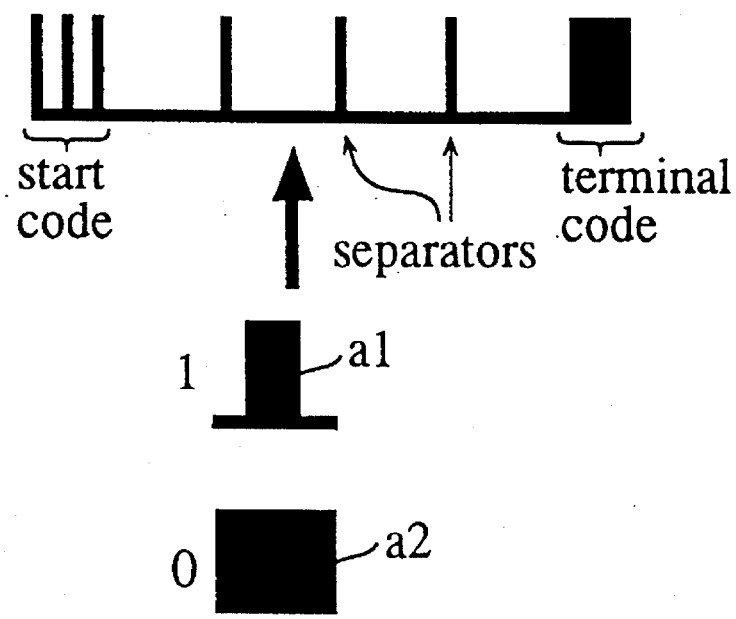
FIGS. 7A and 7B show the configuration of an embedding-pattern to be embedded in a character.
Figure 7B:

The number of dots in a bar code pattern is determined in accordance with the print resolution of the laser printer 23. When the print resolution is 1000 dpi, the printer can print 24-point font in more than about 333 dots (1000 dpi×24 points /72=about 333 dots). Since the size of a pattern to be embedded is made about 1/10 of the font for print, the pattern becomes 1 by 33 dots. As shown in FIG. 7A, the pattern includes a leading code and a terminal code in five dots at the left and right ends. The area separated by the leading and terminal codes are divided into four by 1 by 1 dot separator. As shown in FIG. 7B, 1 by 5 dot patterns a1 and a2 are included in these four areas to express 4-bit data in binary. The data thus expressed are called security information. The security information can be a signature for indicating that the characters are original, so that the presence of falsification or forgery can be detected by checking the security information.

The security information can be used by embedding-pattern generation unit 3. In the case that the printing device connected to the document generation apparatus has a high printing resolution, the security information can include more sign bits. Consequently, the security information can be the date of the document formation, the size or style of the print letter, print location of the print letters, or the title of a document containing the print letter.

A Linotype-Hell Linotronic 330 is an example of such a printing device, and Seiko Electronic Industry CS-7151 is an example of a reading device for reading bar codes with 1000 dpi print resolution.

The outline pattern generation unit 4 generates a bit-mapped pattern for the outlines of a character onto the bit-mapped pattern buffer 2 as follows, based on the transformed contents of the font ROM1.

Figure 8:
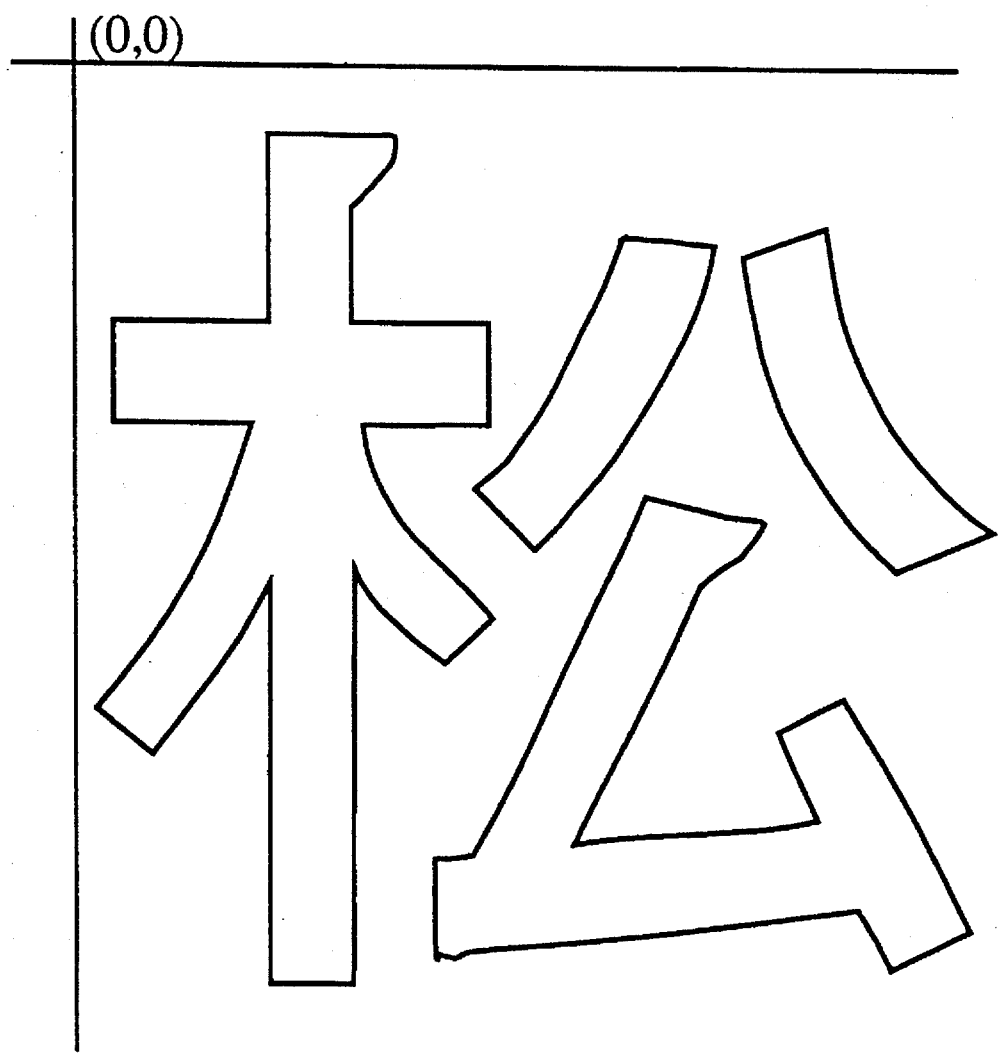
FIG. 8 shows a character to be used for explaining consecutive coordinates of outlines.

The outline pattern generation unit 4 transforms the font ROM1 in accordance with the code, style, and size of each character. As a result of the transformation process, consecutive coordinates of the outline are outputted. The outline pattern generation unit 4 receives the outputted consecutive coordinates and sets the value of the dots for the consecutive coordinates to "1". Consequently, the bit-mapped pattern of the outlines of a character are formed on the bit-mapped pattern buffer 2 as shown in FIG. 8.

The internal process unit 5 embeds the embedding-patterns p1 having 1 by 33 dots shown in FIG. 7 in the area enclosed by the bit-mapped pattern for the outlines on the bit-mapped pattern buffer 2. This process is explained with reference to FIGS. 9 and 10.

Figures 9A, 9B:
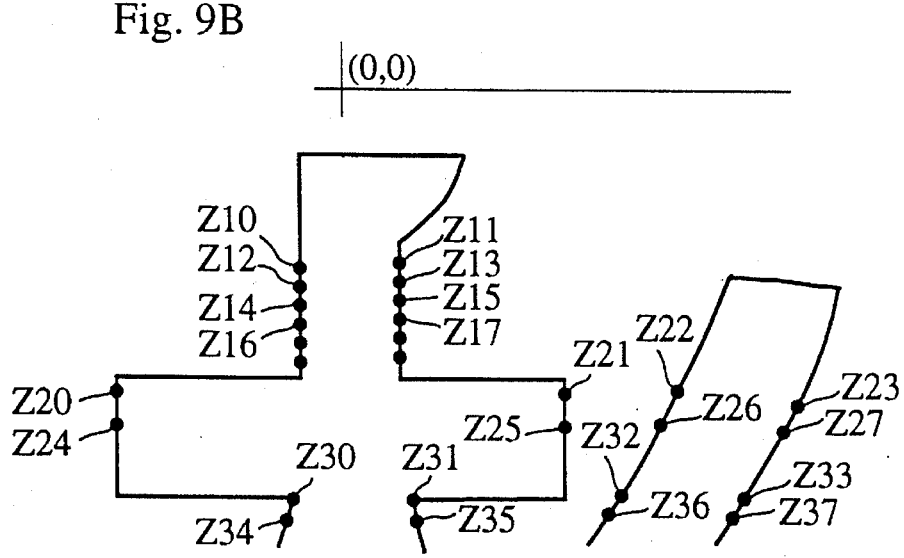
FIGS. 9A and 9B show the coordinate pairs of outlines.

The internal process unit 5 rearranges opposing coordinate pairs among the outline coordinates generated by the outline pattern generation unit 4 as shown in FIG. 9A.

The pair 1 in FIG. 9A corresponds to the coordinate points $z10$ and $z11$ shown in FIG. 9B. The pair 2 corresponds to $z12$ and $z13$. The pair 3 corresponds to $z14$ and $z15$. The coordinate points $z20$ and $z21$; $z22$ and $z23$; $z34$ and $z35$; and $z36$ and $z37$ are paired respectively to determine the embedding range of each embedding-pattern.

Figure 10A:
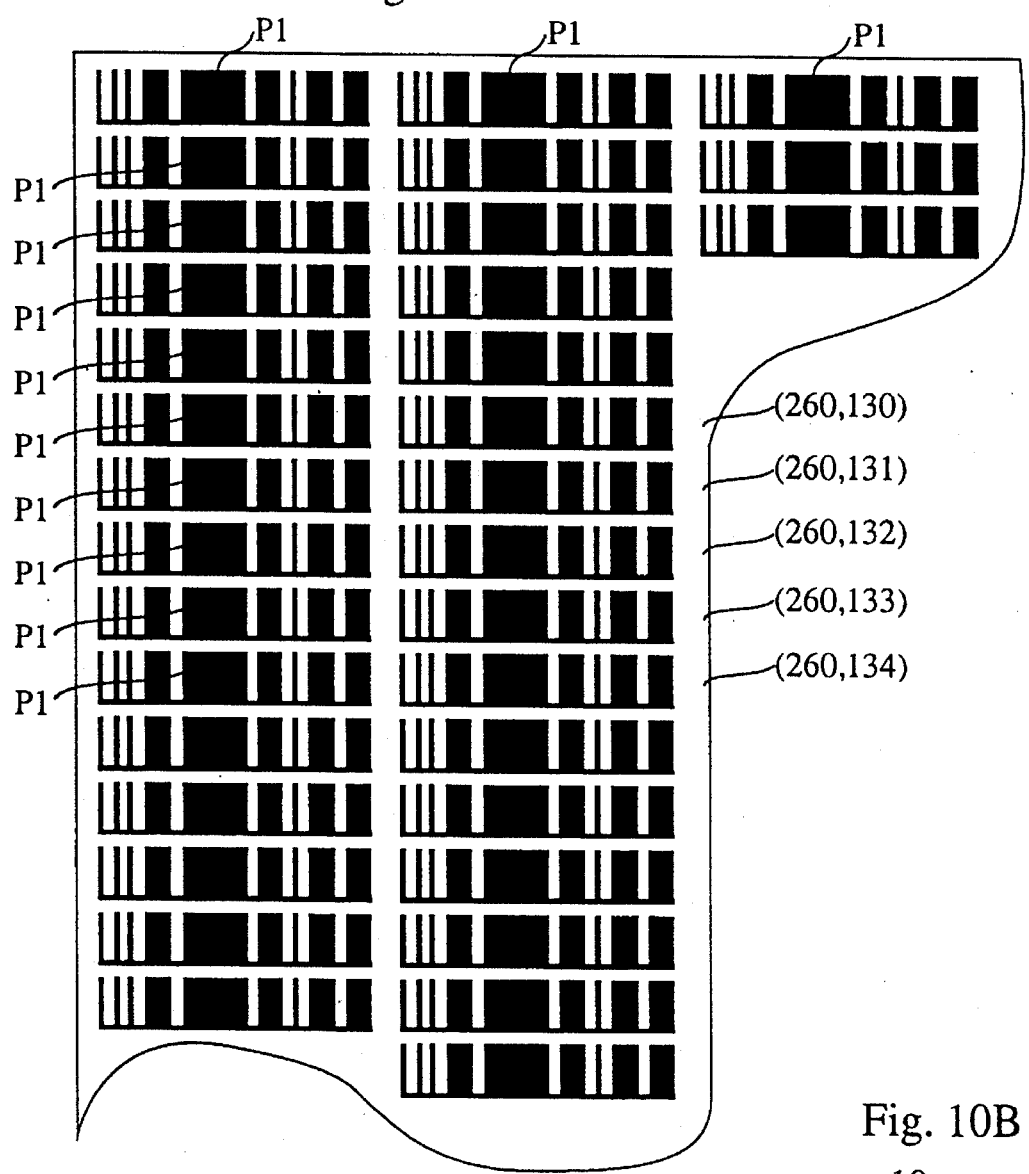
FIG. 10A and 10B show the process of embedding embedding-patterns inside the outlines.
Figure 10B:
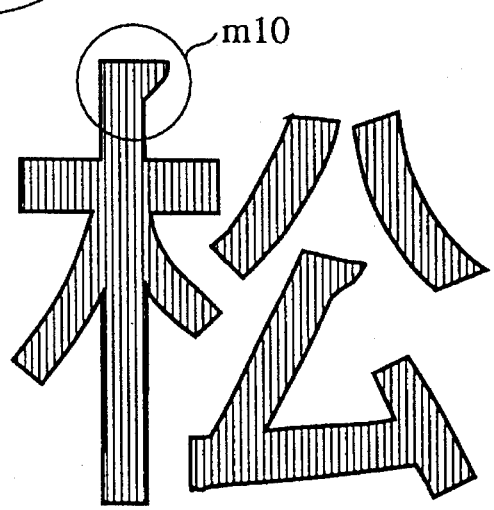

The internal process unit 5 embeds the embedding-patterns between each of these paired outline coordinates. As a result, an assembly of two-dimensional embedding-patterns shown in FIG. 10A is formed. The embedding operation is continued until a bit-mapped pattern shown in FIG. 10B is formed on the bit-mapped pattern buffer 2.

The bit-mapped pattern transfer unit 6 transfers the bit-mapped pattern in the bit-mapped pattern buffer 2 to a page memory 60 block by block.

Figure 11:
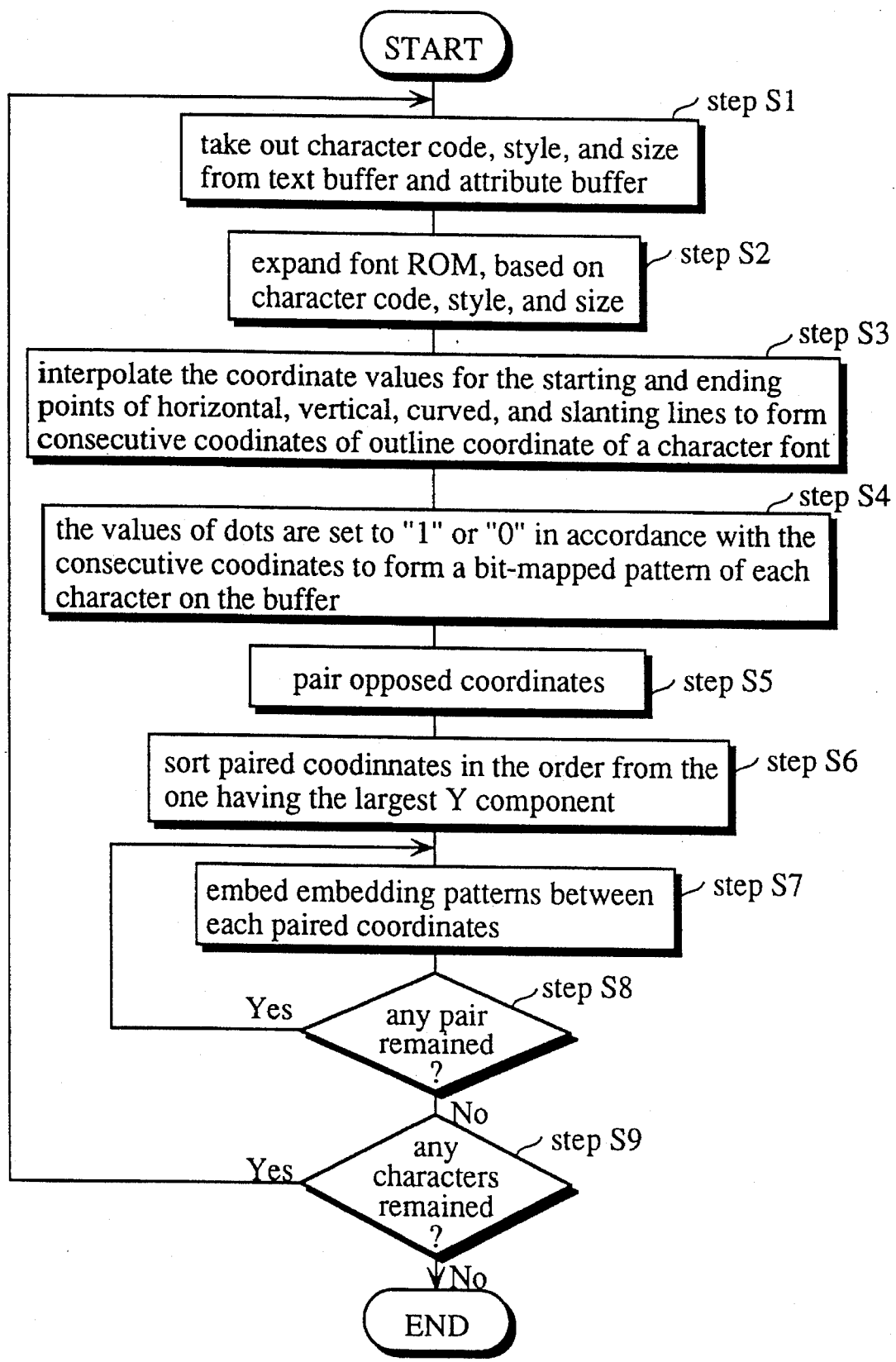
FIG. 11 is a flowchart depicting the operation of the control unit 7.
Figure 12:
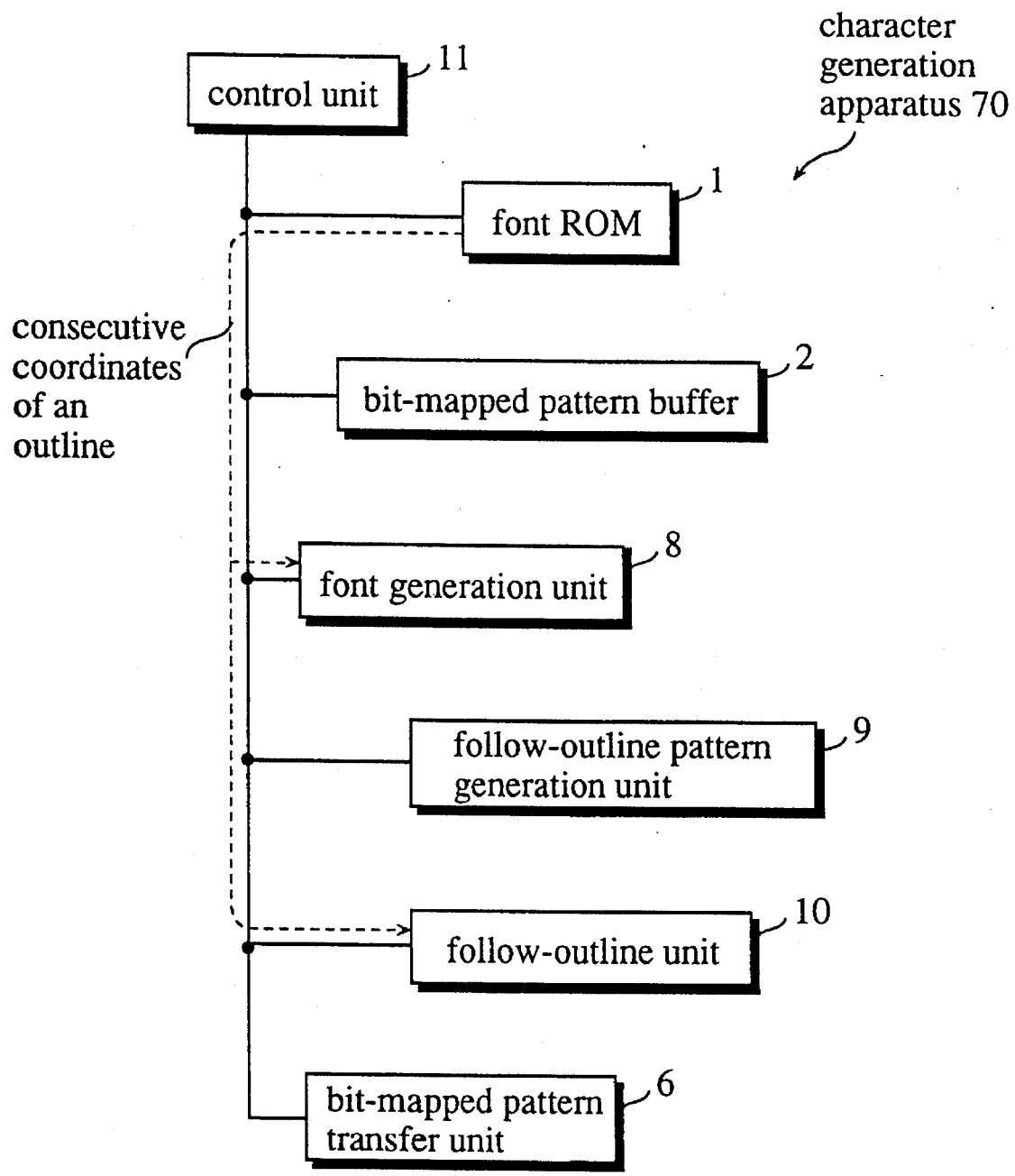
FIG. 12 shows the construction of the bit-mapped pattern generation apparatus 70 of the second embodiment.

As shown in the flowchart in FIG. 11, the control unit 7 controls the process of the bit-mapped pattern generation apparatus 50.

Assumed that the user has completed the generation of a document by inputting characters to the document generation apparatus provided with the bit-mapped pattern generation apparatus 50, applying a predetermined operation to the characters, and setting attributes of the characters. After the completion of the generation of the document, the user directs the document generation apparatus to start a printing operation of the generated document. As a result, the bit-mapped pattern generation apparatus 50 starts its operation.

The control unit 7 takes out a character code, character style, and character size from the text buffer and the attribute buffer (step 1). The control unit 7 makes the outline pattern generation unit 4 transform the font ROM 1 with this information (step 2) and interpolate the coordinate values for the starting and ending points of horizontal lines, vertical lines, curved lines, and slanting lines, thereby forming consecutive coordinates of the outline coordinate (step 3). Then, the values of the dots in the bit-mapped pattern buffer 2 are set to "1" or "0" in accordance with the consecutive outline coordinates, and a bit-mapped pattern only for the outlines of each character is formed (step 4). After the formation, the control unit 7 starts the internal process unit 5 to form coordinate pairs each sharing the same line in the consecutive outline coordinates, that is, having the same Y axis component (step 5). The paired coordinates are sorted in the order starting from the smallest X axis component (step 6). Then, the control unit 7 embeds embedding-patterns between each paired coordinate (step 7). Thus, an assembly of embedding-patterns are formed inside the outline bit-mapped pattern (step 8). After the bit-mapped pattern for a character is formed, the same operation is continued for one page in the page memory 60 (step 9). The bit-mapped patterns for one page are outputted on predetermined paper when the user gives direction to the laser printer 23.

Assume that a large number of documents are checked after having been stored for several months and a part of these documents has been found to be something wrong. In such a case, the user uses a tempered-document detector to detect whether the document is tampered with. The tempered-document detector is composed of an optical reader for reading bit-mapped patterns having 1000 dpi print resolution and a check unit for checking the read bit-mapped patterns with the standard of the security information. The user checks every character in the document in question to determine whether the document has been tempered with or not.

Thus, in the bit-mapped pattern generation apparatus of the present invention, information indicating that the print characters are original is included when the print characters are formed, so that the user can use print characters which make it easy to detect the presence of falsification.

Embodiment 2

The construction of the bit-mapped pattern generation apparatus 70 of this embodiment is shown in FIG. 11 where like components are labeled with like reference numerals with respect to the first embodiment, and the description of these components is not repeated.

Unlike the bit-mapped pattern generation apparatus 50 which adds security information to the inside of the outlines of the print character, the bit-mapped pattern generation apparatus 70 so includes security information in the outlines of the print character that it can be read through the outline reading process. The technique of reading outlines is described in the document shown below:

"Digital Image Processing" by Rosenfeld and Kak (translated by Makoto Nakao) published by Kindai Kagakusha, ISBN4-7649-0049-1

The bit-mapped pattern generation unit 70 is provided with a font generation unit 8, a follow-outline pattern generation unit 9, and a follow-outline unit 10 instead of the embedding-pattern generation unit 3, the outline pattern generation unit 4, and the internal process unit 5 of the bit-mapped pattern generation unit 50.

Figure 13A:
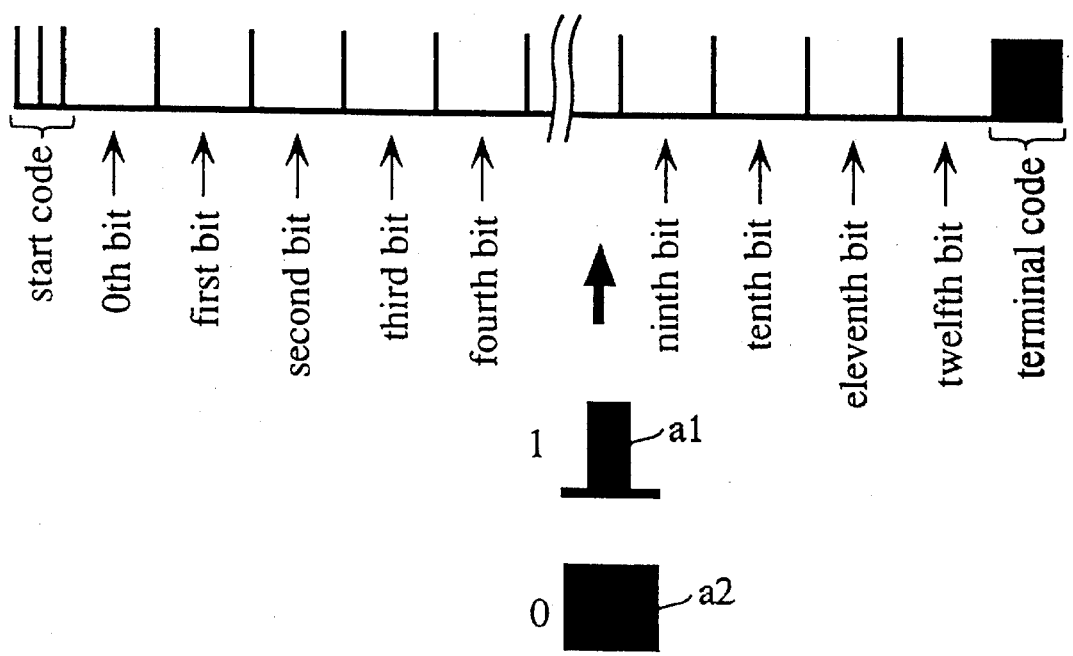
FIGS. 13A and 13B show a follow-outline pattern.

The follow-outline pattern generation unit 9 generates a follow-outline pattern in the form of a bar code to include security information. Since the follow-outline pattern is supposed to be embedded on the outline, security information having a longer code length than in the first embodiment is included. FIG. 13A shows an example of a follow-outline pattern where a leading code a1, a terminal pattern a2, and a separator are the same form as those in the first embodiment. The code length of the security information is extended from 4 bits to 12 bits. In the example shown in FIG. 13B, the security information is expressed by binary numbers "1011 1110 0011". As a result of the extension of the security information, the follow-outline pattern becomes 1 by 72 dots.

The font generation unit 8 generates the bit-mapped pattern of outlines on the bit-mapped pattern buffer 2 by transforming the font ROM1. After the generation, dots corresponding to the internal area of the outlines are set to "1", thereby forming the bit-mapped pattern of a character.

Figure 14:
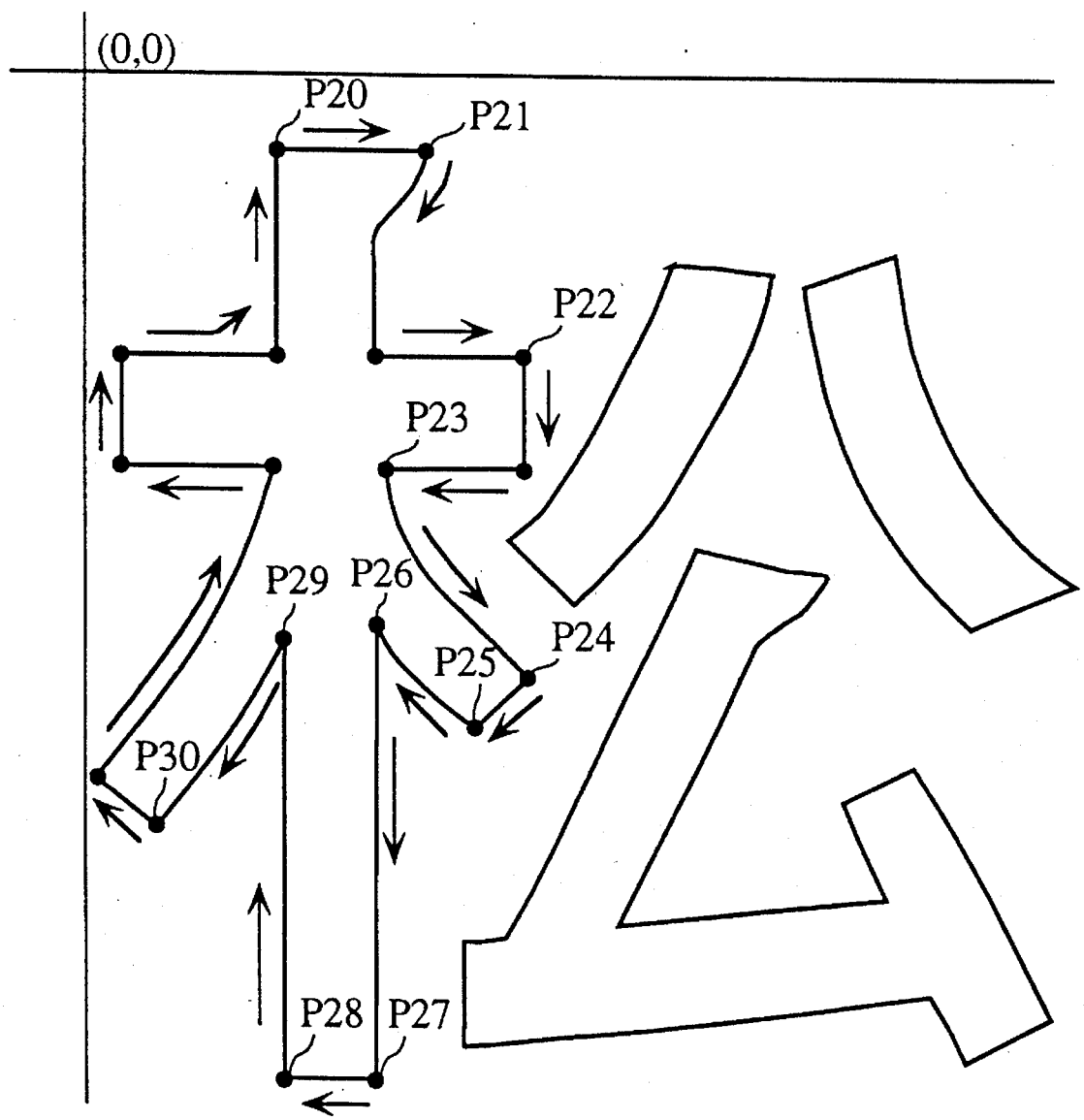
FIG. 14 shows a character to be used for explaining the order of following the outlines.
Figure 15A:
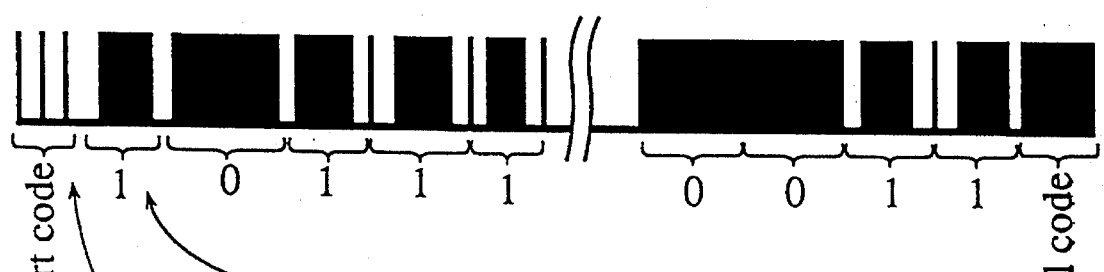
FIGS. 15a and 15b show the outlines followed by the follow-outline unit 10.

The follow-outline unit 10 follows a part of the outlines of the bit-mapped pattern generated on the bit-mapped pattern buffer 2, so that the security information can be read through an outline read process. The part corresponds to the outlines of the bit-mapped pattern. This process is described with reference to FIGS. 14, 15a, and 15b.

Figure 13B:
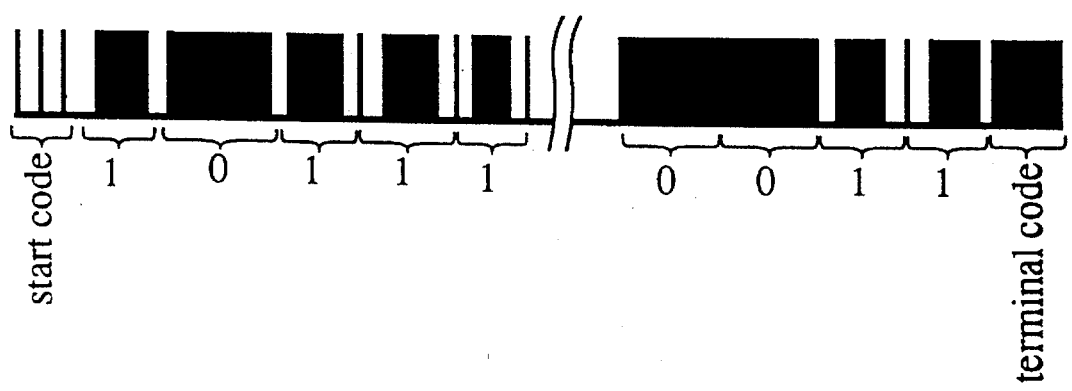
Figure 15B:
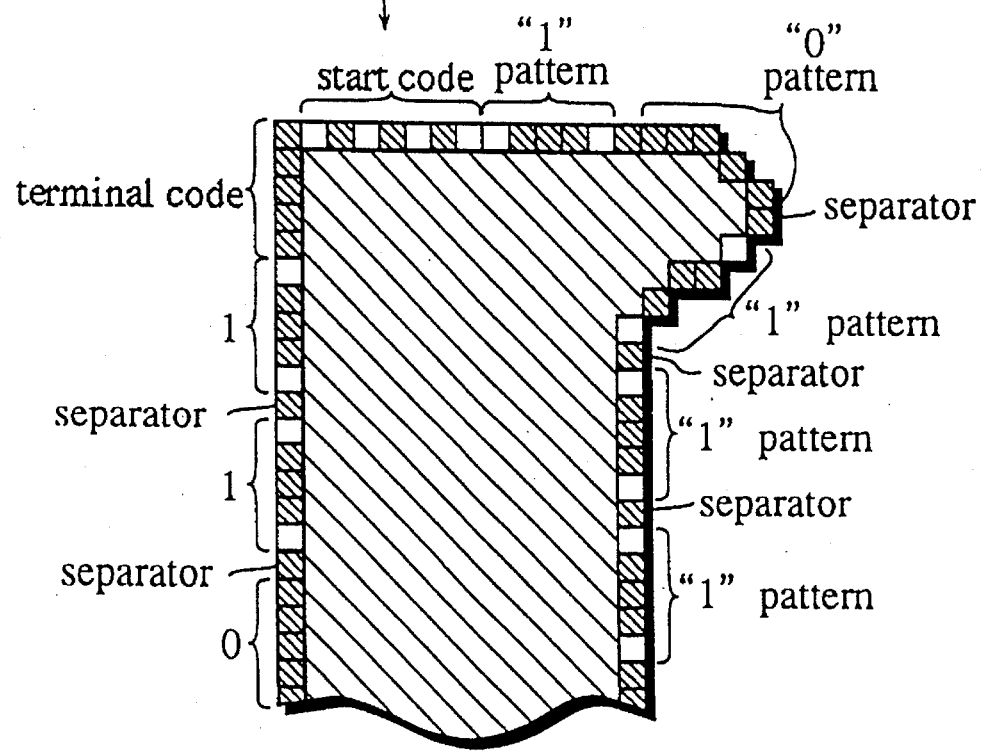

First of all, the follow-outline unit 10 obtains all the outline coordinates generated by the font generation unit, and rearranges the outline coordinates. The order of this rearrangement starts from the point P20 which is the closest to the origin (0.0), and goes to points P21, P22, P23, P24 . . . until returns to the point P20 (this is called a cyclic order). After the rearrangement, the follow-outline unit 10 follows the outline in this cyclic order as shown in FIG. 15b. In FIG. 13B, the follow-outline pattern consists of 1 by 72 dots which are arranged "1" and "0" alternately, so that the follow-outline process can be realized by setting the value of each dot to "1" and "0" in the cyclic order. The follow-outline unit 10 sets the values of the dots of the outlines to "1" or "0" in accordance with the start code "0101010", "1" pattern "01110", separator "1", "0" pattern "11111", separator "1" . . . , thereby embedding the security information in the outlines of the character.

Figure 16:
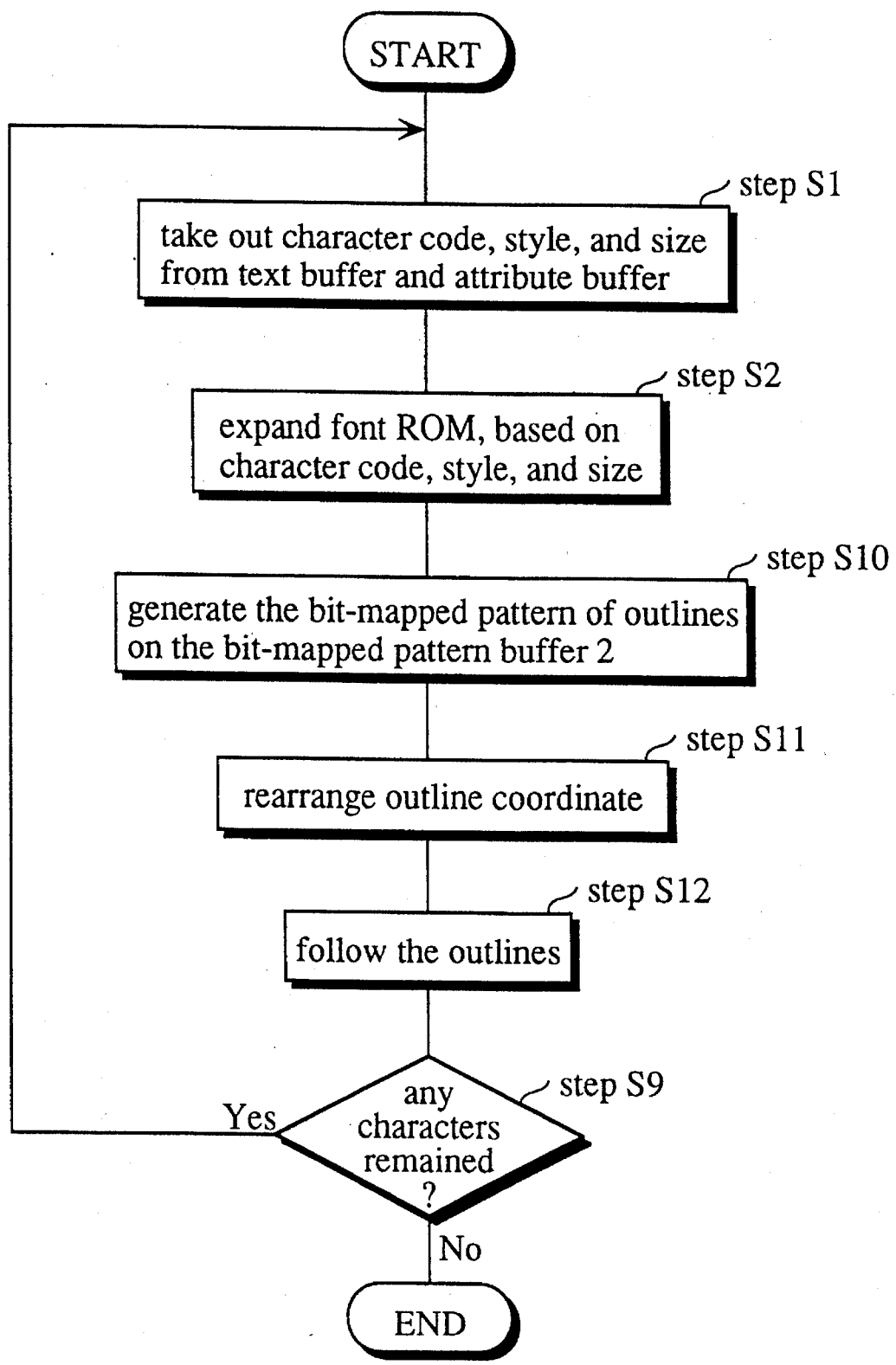
FIG. 16 is a flowchart depicting the operation of the control unit 11.

The control unit 11, like the control unit 7, controls the process of the bit-mapped pattern generation apparatus 70 as shown in the flowchart of FIG. 16. The flowchart is different from that shown in FIG. 11 in that steps 10, 11, and 12 are included instead of the steps 3–8.

Assumed that the user has completed the generation of a document by inputting characters to the document generation apparatus provided with the bit-mapped pattern generation apparatus 70, applying a predetermined operation to the characters, and setting attributes of the characters. After the completion of the generation of the document, the user directs the document generation apparatus to start a printing operation of the generated document. As a result, the bit-mapped pattern generation apparatus 70 starts its operation.

The control unit 11 takes out the character code, character style, and character size for one character from the attribute buffer and the text buffer (step 1), then makes the font generation unit 8 to transform the font ROM1 in the style and the character size, thereby generating the bit-mapped pattern of the character on the bit-mapped pattern buffer 2 (step 10). After the transformation, the control unit 11 makes the follow-outline unit 10 rearrange the outline coordinates (step 11) and follow in the rearranged order (step 12).

After the bit-mapped pattern for a character is formed, the same operation is continued for one page in the page memory 60. The bit-mapped patterns for one page are outputted on predetermined paper when the user gives direction to the laser printer 23.

Assume that a large number of documents are checked after having been stored for several months and a part of these documents has been found to be something wrong. In such a case, the user uses a tempered-document detector to detect whether the document is tampered with.

The tempered-document detector is composed of an optical reader for reading bit-mapped patterns having 1000 dpi print resolution, an outline extract unit for extracting only the outlines of the bit-mapped patterns of the read print characters, and a check unit for checking the extracted bit-mapped patterns with predetermined security information. The user checks every character in the document in question to determine whether the document has been tempered with or not.

In the bit-mapped pattern apparatus of this embodiment, security information is added to print characters by following the outlines, so that larger amount of security information can be added to the print characters. Consequently, documents with print characters which are not easily tempered with can be formed.

Although chinese characters are exclusively used in the above embodiments, any letters such as Roman, Russian, Greek, Arabic, Japanese or scientific symbols or units can be used.

When the document generation apparatus is provided with a page memory corresponding to three primary colors: red (R), green(G), and blue (B), and the printing device can exhibit red, blue, green, cyan, magenta, yellow, while, and black, the bit-mapped character generation apparatus may use these colors with 0–7 gradations to color embedding-patterns within the outline.

For example, when security information is added to the print character having 1000 dpi and 24 points with 33-dot patterns like in the first embodiment, the bit-mapped pattern generation apparatus designates 8 colors to the bit-mapped pattern corresponding to "1" and "0", and embeds the patterns in the print character (An embedding operation with 8 colors is carried out by setting the values of the dots in the area within the outlines of the print character to "1" and "0" in the page memory corresponding to three primary colors R, G, and B). By embedding 33-dot patterns, 8×8×8×8= 4096 bit security information can be added to the 1000 dpi and 24-point print characters.

In addition, the printing device can set luminance gradations of color density per dot. When the document generation apparatus is provided with a page memory for displaying gradations, it is possible to color the patterns with gradations. For example, when 33-dot patterns are used to add security information to the print character having 1000 dpi and 24 points, like in the first embodiment, the bit-mapped pattern generation apparatus can designate 0–16 gradations of color density to the bit-mapped patterns corresponding to "1" and "0", and embed the patterns inside the outlines of the print character (An embedding operation with four gradations is carried out by setting the values of the dots in the area within the outlines of the print characters on pages 1 and 2 to "1" and "0" as shown in {rule 1}).

By using 33-dot patterns, 4×4×4×4=256 bit security information can be added to the 1000 dpi and 24-point print characters. .

| {rule 1} gradations | a page memory 1 | a page memory 2 |
|---|---|---|
| 3 | 1 | 1 |
| 2 | 1 | 0 |
| 1 | 0 | 1 |
| 0 | 0 | 0 |

When the document generation apparatus is provided with a page memory corresponding to three primary colors: red (R), green(G), and blue (B), and the printing device can exhibit red, blue, green, cyan, magenta, yellow, white, and black, the bit-mapped pattern generation apparatus may use these colors with 0–7 gradations to color the embedding-patterns within the outlines.

For example, 33-dot patters are used to add security information to the print character having 1000 dpi and 24 points, like in the first embodiment, the bit-mapped character generation apparatus designates 8 colors to the bit-mapped pattern corresponding to "1" and "0" and four gradations, and embeds the patterns inside the outline of the print character (An embedding operation with 8 colors is carried out by setting the values of the dots in the area within the outlines of the print character to "1" and "0"). By embedding 33-dot patterns, 8×8×8×8=4096 bit security information can be added to the 1000 dpi and 24-point print characters.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An apparatus for generating a bit-mapped pattern by embedding embedding-patterns on and inside of outlines of a character to be printed by a printer, said apparatus comprising:

an outline bit-mapped pattern generation means for generating a bit-mapped pattern of outlines of a character, said bit-mapped pattern being expressed by x and y coordinates;

an embedding-pattern generation means for generating embedding-patterns which include predetermined information in a form of a bar code; and an internal embedding means for embedding the embedding-patterns inside the bit-mapped pattern, the embedding patterns being embedded at every predetermined width in one of an x direction and a y direction, wherein said bar code includes information on any one of a position of a character on printing paper, a page of the printing paper, a title of a document containing the character, and a generator of the document.

2. The apparatus of claim 1, wherein the embedding-patterns have at least one dot width.

3. The apparatus of claim 2, wherein when said printer can print each dot of the bit-mapped patterns in color, said embedding-pattern generation means generates embedding-patterns whose dots are distinguished between colors in accordance with the predetermined information, and said internal embedding means embeds the color-distinguished embedding-patterns in the bit-mapped patterns.

4. The apparatus of claim 3, wherein when said printer can set gradations of printing density to each dot of the bit-mapped patterns, each dot of embedding-patterns that can be set gradations of printing density in accordance with the predetermined information are used.

5. The apparatus of claim 2, wherein said printer can print each dot of the bit-mapped patterns in color, said embedding-pattern generation means generates embedding-patterns for each primary color, and said internal embedding means overlaps and embeds the primary colored embedding-patterns in the bit-mapped patterns.

6. The apparatus of claim 5, wherein when said printer can set gradations of printing density to each dot of the bit-mapped patterns, each dot of embedding-patterns that can be set gradations of printing density in accordance with the predetermined information are used.

7. The apparatus of claim 2, wherein when said printer can set gradations of printing density to each dot of the bit-mapped patterns, each dot of embedding-patterns that can be set gradations of printing density in accordance with the predetermined information are used.

8. An apparatus for generating a bit-mapped pattern by embedding embedding-patterns on and inside of outlines of a character to be printed by a printer, said apparatus comprising:

a calculating means for calculating all x and y coordinates of outlines of a character, based on a font ROM which stores an outline font;

an outline bit-mapped pattern generation means for generating a bit-mapped pattern of outlines of a character from coordinates calculated by said calculating means;

an embedding-pattern generation means for generating embedding-patterns which include predetermined information in a form of a bar code;

a coordinate pair generation means for pairing two coordinates which are opposite to each other on an outline, and have a same x or y coordinate; and an internal embedding means for embedding the embedding-patterns between each coordinate pair generated by said coordinate pair generation means, wherein said bar code includes information on any one of a position of a character on printing paper, a page of the printing paper, a title of a document containing the character, and a generator of the document.

9. The apparatus of claim 8, wherein the embedding-patterns have at least one dot width.

10. The apparatus of claim 9, wherein when said printer can print each dot of the bit-mapped patterns in color, said embedding-pattern generation means generates embedding-patterns whose dots are distinguished between colors in accordance with the predetermined information, and said internal embedding means embeds the color-distinguished embedding-patterns between each coordinate pair generated by said coordinate pair generation means.

11. The apparatus of claim 10, wherein when said printer can print each dot of the bit-mapped patterns in color, said embedding-pattern generation means generates embedding-patterns whose dots are distinguished between colors in accordance with the predetermined information, and said internal embedding means embeds the color-distinguished embedding-patterns in the bit-mapped patterns.

12. The apparatus of claim 9, wherein when said printer can print each dot of the bit-mapped patterns in color, said embedding-pattern generation means generates embedding-patterns for each primary color, and said internal embedding means overlaps and embeds the primary colored embedding-patterns between each coordinate pair generated by said coordinate pair generation means.

13. The apparatus of claim 9, wherein when said printer can set gradations of printing density to each dot of the bit-mapped patterns, each dot of embedding-patterns that can be set gradations of printing density in accordance with the predetermined information are used.

14. The apparatus of claim 12, wherein when said printer can set gradations of printing density to each dot of the bit-mapped patterns, each dot of embedding-patterns that can be set gradations of printing density in accordance with the predetermined information are used.

15. An apparatus for generating a bit-mapped pattern by embedding embedding-patterns on and inside of outlines of a character to be printed by a printer, said apparatus comprising:

an outline bit-mapped pattern generation means for generating a bit-mapped pattern of outlines of a character, said bit-mapped pattern being expressed by x and y coordinates;

an embedding means for embedding the embedding-patterns inside of the bit-mapped pattern generated by said on-line bit-mapped pattern generation means;

an embedding-pattern generation means for generating embedding-patterns which include predetermined information in a form of a bar code; and an along-outline embedding means for embedding embedding-patterns having a predetermined width along with the outlines, after said embedding means has embedded the embedding-patterns, wherein said bar code includes information on any one of a position of a character on printing paper, a page of the printing paper, a title of a document containing the character, and a generator of the document.

16. The apparatus of claim 15, wherein the embedding-patterns have at least one-dot width.

17. The apparatus of claim 16, wherein when said printer can print each dot of the bit-mapped patterns in color, said embedding-pattern generation means generates embedding-patterns whose dots are distinguished between colors in accordance with the predetermined information, and said along-outline embedding means embeds the color-distinguished embedding-patterns along the outlines.

18. The apparatus of claim 17, wherein when said printer can set gradations of printing density to each dot of the bit-mapped patterns, each dot of embedding-patterns that can be set gradations of printing density in accordance with the predetermined information are used.

19. The apparatus of claim 17, wherein said printer can print each dot of the bit-mapped patterns in color, said embedding-pattern generation means generates embedding-patterns for each primary color, and said along-outline embedding means overlaps and embeds the primary colored embedding-patterns along the outlines.

20. The apparatus of claim 19, wherein when said printer can set gradations of printing density to each dot of the bit-mapped patterns, each dot of embedding-patterns that can be set gradations of printing density in accordance with the predetermined information are used.

* * * * *